United States Patent [19]

Aragaki

[11] Patent Number: 5,204,738
[45] Date of Patent: Apr. 20, 1993

[54] METHOD OF AN APPARATUS FOR COMPRESSING IMAGES DATA

[75] Inventor: Masami Aragaki, Toyonaka, Japan

[73] Assignee: Dainippon Screen Mfg. Co., Ltd., Japan

[21] Appl. No.: 627,739

[22] Filed: Dec. 14, 1990

[30] Foreign Application Priority Data

Dec. 15, 1989 [JP] Japan .................................. 1-326475

[51] Int. Cl.$^5$ ............................................. H04N 1/46
[52] U.S. Cl. ..................................... 358/75; 358/426
[58] Field of Search .................... 358/75, 426, 261.1, 358/261.2, 261.3, 262.2; 382/56

[56] References Cited

U.S. PATENT DOCUMENTS 4,776,030 10/1988 Tzou ..................................... 382/56
5,018,024 5/1991 Tanioka ................................ 358/462

FOREIGN PATENT DOCUMENTS 1179778 12/1984 Canada ................................. 358/462
0349847 1/1990 European Pat. Off. .

OTHER PUBLICATIONS

IEEE International Conference on Communications; vol. 1; pp.B.4.6-1 to B.4.6-5; Kwarta et al.; Jun. 1983.

Primary Examiner—Edward L. Coles, Sr.
Assistant Examiner—Jill Jackson
Attorney, Agent, or Firm—Ostrolenk, Faber, Gerb & Soffen

[57] ABSTRACT

An image is conceptually divided into pixel blocks each having a plurality of pixels. RGB image data representing the image are converted into luminance data and color difference data in the NTSC form. Standard deviation values of these data are calculated in each pixel block and are compared with threshold values, so that the pixel blocks are classified into two types. The image data in the pixel blocks of respective types are compressed at different compression rates to obtain image data compressed.

16 Claims, 18 Drawing Sheets

FIG.5D $Y_i$          $\sigma_Y = 72.5$

|   | 0 | 1 | 2 | 3 | 4 | 5 | 6 | 7 |
|---|---|---|---|---|---|---|---|---|
| 0 | 204 | 206 | 198 | 202 | 198 | 198 | 199 | 201 |
| 1 | 216 | 228 | 218 | 214 | 211 | 202 | 200 | 205 |
| 2 | 206 | 126 | 36 | 73 | 201 | 201 | 193 | 199 |
| 3 | 122 | 0 | 0 | 0 | 137 | 211 | 201 | 199 |
| 4 | 95 | 0 | 2 | 0 | 128 | 217 | 202 | 202 |
| 5 | 167 | 28 | 0 | 38 | 173 | 208 | 194 | 201 |
| 6 | 223 | 210 | 188 | 192 | 214 | 206 | 198 | 200 |
| 7 | 207 | 218 | 214 | 205 | 203 | 199 | 194 | 196 |

FIG.5E $I_i$          $\sigma_I = 4.4$

| -4 | -1 | -4 | -1 | -3 | -2 | -4 | -4 |
|---|---|---|---|---|---|---|---|
| -2 | -2 | -3 | -1 | -8 | -5 | -2 | -5 |
| -4 | 1 | -3 | 10 | -3 | -4 | -3 | -3 |
| -7 | 0 | 0 | 0 | -7 | -1 | -5 | -2 |
| -9 | 0 | -1 | 0 | -9 | -2 | -5 | -3 |
| -12 | -15 | 0 | -11 | -7 | -3 | -5 | -4 |
| -1 | -13 | -21 | -9 | -3 | -2 | -4 | -4 |
| 0 | -1 | 0 | -2 | -2 | -1 | -3 | -3 |

FIG.5F $Q_i$          $\sigma_Q = 1.8$

| -1 | -1 | 0 | 0 | 0 | -2 | 0 | 0 |
|---|---|---|---|---|---|---|---|
| -1 | 0 | -1 | 0 | 2 | -1 | 0 | 0 |
| 1 | -8 | -2 | 3 | -3 | -1 | 0 | -2 |
| -1 | 0 | 0 | 0 | -3 | -2 | 0 | -1 |
| 0 | 0 | -1 | 0 | 0 | 0 | 0 | 0 |
| 4 | 1 | 0 | 0 | -1 | -1 | -2 | -2 |
| 0 | 2 | 1 | 0 | 0 | 0 | 0 | 0 |
| -1 | -2 | -5 | -1 | -1 | -1 | -1 | 0 |

FIG.5G $F_{mn}(Y_1)$

|   | 0   | 1   | 2   | 3   | 4  | 5  | 6   | 7  |
|---|-----|-----|-----|-----|----|----|-----|----|
| 0 | 164 | -36 | 20  | 32  | 7  | -4 | 5   | 5  |
| 1 | 4   | 4   | 0   | -3  | 0  | -1 | -2  | -1 |
| 2 | 57  | 62  | -24 | -41 | -6 | 0  | -10 | -7 |
| 3 | -8  | -11 | 0   | 2   | 1  | 4  | 4   | 0  |
| 4 | -13 | -14 | 0   | -4  | -8 | 3  | 6   | 0  |
| 5 | 0   | 0   | 2   | 5   | 3  | 0  | 0   | 0  |
| 6 | -12 | -10 | 8   | 16  | 9  | -2 | -1  | 1  |
| 7 | 3   | 4   | 0   | -1  | -1 | -3 | -3  | -1 |

| -4 | 0  | 0  | 0  | 0  | 0  | 0  | -1 |
|----|----|----|----|----|----|----|----|
| 1  | 1  | 0  | -1 | 0  | 0  | -1 | -1 |
| 0  | 0  | 0  | 2  | 1  | 0  | 0  | 0  |
| -2 | -1 | 0  | 0  | 0  | 0  | 1  | 1  |
| 1  | 1  | 0  | -1 | -1 | -1 | 0  | 0  |
| 0  | -1 | 0  | 1  | 1  | 0  | 0  | 0  |
| 0  | 0  | -1 | -1 | 0  | 0  | 0  | 0  |
| 0  | 0  | 0  | 0  | 1  | 0  | -1 | -1 |

FIG.5I $F_{mn}(Q_1)$

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 1 | 0 | 0 | 0 |
| 0 | 0 | 0 | 0 | 0 | 0 | 0 | 0 |

|   | 0 | 1 | 2 | 3 | 4 | 5 | 6 | 7 |
|---|---|---|---|---|---|---|---|---|
| 0 | 71 | 70 | 73 | 64 | 74 | 64 | 42 | 0 |
| 1 | 74 | 62 | 66 | 64 | 64 | 53 | 0 | 0 |
| 2 | 56 | 64 | 73 | 56 | 66 | 64 | 0 | 143 |
| 3 | 71 | 71 | 56 | 61 | 56 | 0 | 91 | 255 |
| 4 | 79 | 77 | 70 | 62 | 0 | 23 | 253 | 168 |
| 5 | 58 | 55 | 66 | 8 | 0 | 191 | 204 | 0 |
| 6 | 72 | 71 | 48 | 0 | 135 | 255 | 36 | 0 |
| 7 | 63 | 48 | 0 | 71 | 251 | 112 | 0 | 45 |

| 99 | 97 | 101 | 88 | 91 | 84 | 64 | 0 |
| 98 | 85 | 84 | 85 | 78 | 72 | 12 | 7 |
| 76 | 82 | 102 | 77 | 104 | 82 | 0 | 191 |
| 99 | 99 | 77 | 83 | 68 | 0 | 127 | 255 |
| 112 | 104 | 96 | 80 | 0 | 47 | 255 | 192 |
| 83 | 79 | 92 | 26 | 23 | 239 | 224 | 8 |
| 106 | 96 | 64 | 0 | 199 | 255 | 48 | 15 |
| 88 | 68 | 0 | 95 | 255 | 128 | 15 | 71 |

| 99 | 77 | 91 | 79 | 85 | 82 | 60 | 0 |
| 88 | 79 | 81 | 79 | 73 | 63 | 2 | 0 |
| 75 | 80 | 90 | 75 | 103 | 84 | 0 | 191 |
| 88 | 98 | 77 | 77 | 64 | 0 | 127 | 255 |
| 99 | 96 | 80 | 74 | 0 | 45 | 255 | 180 |
| 75 | 79 | 83 | 28 | 15 | 247 | 232 | 0 |
| 96 | 92 | 48 | 0 | 207 | 255 | 36 | 11 |
| 78 | 63 | 0 | 95 | 255 | 112 | 3 | 63 |

A2

FIG. 6D $Y_2$  $\sigma_Y = 65.5$

| i\j | 0 | 1 | 2 | 3 | 4 | 5 | 6 | 7 |
|---|---|---|---|---|---|---|---|---|
| 0 | 90 | 86 | 91 | 79 | 85 | 77 | 56 | 0 |
| 1 | 89 | 77 | 78 | 78 | 73 | 65 | 7 | 4 |
| 2 | 69 | 76 | 91 | 70 | 92 | 76 | 0 | 176 |
| 3 | 89 | 90 | 70 | 75 | 63 | 0 | 116 | 255 |
| 4 | 100 | 95 | 86 | 73 | 0 | 39 | 254 | 183 |
| 5 | 74 | 71 | 83 | 20 | 15 | 225 | 218 | 4 |
| 6 | 94 | 88 | 57 | 0 | 180 | 255 | 43 | 10 |
| 7 | 79 | 61 | 0 | 87 | 253 | 121 | 9 | 62 |

FIG. 6E $I_2$  $\sigma_I = 6.1$

| -14 | -11 | -13 | -11 | -8 | -9 | -10 | 0 |
|---|---|---|---|---|---|---|---|
| -11 | -11 | -8 | -10 | -6 | -8 | -5 | -2 |
| -9 | -8 | -13 | -10 | -18 | -9 | 0 | -24 |
| -13 | -13 | -10 | -10 | -5 | 0 | -18 | 0 |
| -15 | -12 | -11 | -8 | 0 | -11 | -1 | -11 |
| -11 | -12 | -12 | -9 | -10 | -24 | -10 | -3 |
| -16 | -12 | -6 | 0 | -32 | 0 | -5 | -7 |
| -11 | -9 | 0 | -12 | -2 | -6 | -6 | -12 |

FIG. 6F $Q_2$  $\sigma_Q = 3.6$

| 4 | -5 | 0 | 0 | 0 | 2 | 1 | 0 |
|---|---|---|---|---|---|---|---|
| 0 | 0 | 1 | 0 | 0 | -1 | -2 | -2 |
| 2 | 2 | -1 | 2 | 5 | 4 | 0 | 8 |
| 0 | 4 | 3 | 0 | 0 | 0 | 6 | 0 |
| 0 | 0 | -3 | 0 | 0 | 3 | 0 | -1 |
| 0 | 4 | 0 | 4 | 0 | 12 | 7 | -2 |
| 0 | 2 | -5 | 0 | 14 | 0 | -3 | 0 |
| 0 | 0 | 0 | 4 | 0 | -5 | -3 | 0 |

FIG. 6G $F_{mn}(Y_2)$

| m \ n | 0 | 1 | 2 | 3 | 4 | 5 | 6 | 7 |
|---|---|---|---|---|---|---|---|---|
| 0 | 84 | -8 | 3 | 14 | -3 | -7 | 3 | 1 |
| 1 | -11 | 22 | 10 | -38 | 10 | 9 | 0 | -2 |
| 2 | -12 | 29 | -53 | 41 | 8 | -23 | 8 | 0 |
| 3 | 1 | 0 | 6 | 18 | -50 | 36 | -5 | 0 |
| 4 | 5 | -8 | 16 | -25 | 24 | 6 | -23 | 8 |
| 5 | 3 | -2 | -1 | 5 | 1 | -18 | 12 | 0 |
| 6 | 0 | -7 | -2 | -1 | -4 | 4 | 2 | -2 |
| 7 | 4 | -1 | 2 | -2 | 2 | -5 | 3 | 1 |

FIG. 6H $F_{mn}(I_2)$

| -9 | -2 | 0 | 0 | 0 | 0 | 0 | 0 |
|---|---|---|---|---|---|---|---|
| 0 | 0 | 0 | 1 | 1 | -1 | 0 | 0 |
| 0 | 0 | 0 | 0 | -1 | 0 | 1 | 0 |
| 0 | -1 | 1 | -2 | 2 | 0 | -1 | 0 |
| 1 | -1 | -1 | 1 | 1 | -3 | 1 | 2 |
| 0 | 0 | 1 | 0 | 0 | 0 | 2 | -4 |
| -1 | 2 | 0 | 0 | 0 | 0 | -2 | 2 |
| 0 | 0 | 0 | 1 | -3 | 3 | -1 | 0 |

FIG. 6I $F_{mn}(Q_2)$

| 1 | 0 | 0 | 0 | 0 | 0 | 0 | 0 |
|---|---|---|---|---|---|---|---|
| 0 | 0 | 1 | 0 | 0 | 1 | 1 | 0 |
| 0 | 0 | 0 | 0 | 1 | 0 | 0 | 0 |
| 0 | 0 | 0 | 2 | -1 | 1 | 0 | 0 |
| 0 | 0 | 0 | 0 | 0 | 1 | 0 | 0 |
| 0 | 0 | 0 | 0 | 0 | 0 | 0 | 1 |
| 1 | 0 | 0 | 0 | 0 | 1 | 0 | -1 |
| 0 | 0 | 0 | 0 | 2 | -1 | 0 | 0 |

FIG. 7A $R_3$

|   | 0 | 1 | 2 | 3 | 4 | 5 | 6 | 7 |
|---|---|---|---|---|---|---|---|---|
| 0 | 67 | 160 | 36 | 28 | 111 | 144 | 224 | 124 |
| 1 | 40 | 29 | 4 | 8 | 72 | 175 | 208 | 118 |
| 2 | 28 | 27 | 8 | 44 | 55 | 191 | 144 | 115 |
| 3 | 0 | 60 | 52 | 0 | 63 | 215 | 130 | 64 |
| 4 | 0 | 56 | 36 | 0 | 67 | 221 | 120 | 80 |
| 5 | 31 | 0 | 25 | 0 | 106 | 230 | 112 | 108 |
| 6 | 104 | 0 | 0 | 24 | 194 | 210 | 66 | 118 |
| 7 | 151 | 0 | 0 | 28 | 185 | 128 | 64 | 153 |

FIG. 7B $G_3$

| 51 | 80 | 20 | 18 | 34 | 87 | 141 | 52 |
| 33 | 29 | 9 | 30 | 31 | 121 | 138 | 48 |
| 33 | 38 | 21 | 30 | 43 | 130 | 64 | 47 |
| 0 | 53 | 44 | 0 | 50 | 152 | 80 | 43 |
| 0 | 40 | 36 | 0 | 53 | 139 | 68 | 49 |
| 31 | 0 | 26 | 0 | 79 | 152 | 58 | 66 |
| 74 | 0 | 0 | 23 | 135 | 140 | 44 | 67 |
| 107 | 0 | 0 | 25 | 128 | 86 | 40 | 82 |

FIG. 7C $B_3$

| 37 | 49 | 17 | 14 | 4 | 42 | 64 | 25 |
| 32 | 29 | 11 | 21 | 2 | 60 | 65 | 19 |
| 33 | 37 | 1 | 16 | 15 | 63 | 52 | 21 |
| 0 | 53 | 42 | 0 | 22 | 73 | 51 | 23 |
| 0 | 40 | 37 | 0 | 21 | 56 | 33 | 26 |
| 15 | 0 | 32 | 0 | 41 | 58 | 26 | 37 |
| 41 | 0 | 0 | 11 | 62 | 54 | 18 | 38 |
| 59 | 0 | 0 | 12 | 61 | 44 | 17 | 42 |

FIG. 7D $Y_3$ $\quad\quad\quad\quad\quad\quad \sigma_Y = 48.3$

|   | 0 | 1 | 2 | 3 | 4 | 5 | 6 | 7 |
|---|---|---|---|---|---|---|---|---|
| 0 | 54 | 100 | 24 | 20 | 53 | 98 | 157 | 70 |
| 1 | 34 | 29 | 7 | 22 | 39 | 130 | 150 | 65 |
| 2 | 31 | 34 | 14 | 32 | 43 | 140 | 86 | 64 |
| 3 | 0 | 55 | 46 | 0 | 50 | 161 | 91 | 46 |
| 4 | 0 | 44 | 36 | 0 | 53 | 154 | 79 | 55 |
| 5 | 29 | 0 | 26 | 0 | 82 | 164 | 70 | 75 |
| 6 | 79 | 0 | 0 | 21 | 144 | 151 | 47 | 78 |
| 7 | 114 | 0 | 0 | 24 | 137 | 93 | 44 | 98 |

FIG. 7E $I_3$ $\quad\quad\quad\quad \sigma_I = 16.9$

| 9 | 42 | 8 | 5 | 40 | 32 | 47 | 38 |
|---|---|---|---|---|---|---|---|
| 3 | 0 | -2 | -10 | 22 | 31 | 40 | 37 |
| -2 | -5 | -4 | 8 | 8 | 35 | 40 | 36 |
| 0 | 3 | 4 | 0 | 8 | 37 | 27 | 12 |
| 0 | 8 | 0 | 0 | 9 | 47 | 28 | 17 |
| 1 | 0 | 0 | 0 | 16 | 46 | 29 | 23 |
| 17 | 0 | 0 | 1 | 35 | 41 | 13 | 27 |
| 25 | 0 | 0 | 2 | 33 | 24 | 13 | 38 |

FIG. 7F $Q_3$ $\quad\quad\quad\quad \sigma_Q = 17.4$

| -9 | -29 | -4 | -3 | -28 | -32 | -52 | -25 |
|---|---|---|---|---|---|---|---|
| -1 | 0 | 1 | 0 | -21 | -39 | -48 | -26 |
| 0 | 1 | -7 | -9 | -16 | -43 | -19 | -24 |
| 0 | -1 | -2 | 0 | -16 | -50 | -22 | -13 |
| 0 | -2 | 0 | 0 | -18 | -55 | -26 | -16 |
| -8 | 0 | 3 | 0 | -23 | -60 | -25 | -21 |
| -21 | 0 | 0 | -6 | -46 | -54 | -16 | -23 |
| -31 | 0 | 0 | -7 | -43 | -28 | -15 | -31 |

FIG.7G $F_{mn}(Y_3)$

| m\n | 0 | 1 | 2 | 3 | 4 | 5 | 6 | 7 |
|---|---|---|---|---|---|---|---|---|
| 0 | 60 | -37 | 1 | 34 | -13 | -7 | 9 | -2 |
| 1 | 1 | -2 | 10 | -11 | -29 | 13 | -19 | -8 |
| 2 | 7 | 5 | 10 | 4 | 23 | 4 | -11 | 9 |
| 3 | 1 | -3 | 0 | 0 | -10 | -1 | -2 | 1 |
| 4 | 1 | 7 | 4 | -6 | -6 | -4 | -6 | 2 |
| 5 | 3 | 3 | -3 | 2 | 0 | -5 | 0 | 0 |
| 6 | 0 | 2 | 2 | -3 | 2 | 0 | 1 | -1 |
| 7 | 0 | 3 | 0 | 0 | 4 | -2 | -1 | -2 |

FIG.7H $F_{mn}(I_3)$

| 16 | -16 | 2 | 8 | -2 | -3 | 1 | 0 |
|---|---|---|---|---|---|---|---|
| 2 | -3 | 2 | -2 | -5 | 0 | -6 | 0 |
| 4 | 1 | 2 | 0 | 6 | -5 | -2 | 4 |
| 2 | 1 | -1 | 1 | -4 | -2 | -2 | 0 |
| 1 | 4 | 0 | 0 | -1 | -1 | -2 | 0 |
| 1 | 2 | -2 | 0 | 0 | 0 | 0 | 0 |
| 1 | -1 | 0 | -1 | 0 | 1 | -1 | -1 |
| 1 | 0 | 0 | 0 | 0 | 0 | 0 | -1 |

FIG.7I $F_{mn}(Q_3)$

| -17 | 15 | 0 | -12 | 3 | 2 | -3 | 0 |
|---|---|---|---|---|---|---|---|
| 0 | 2 | -2 | 4 | 7 | -2 | 5 | 0 |
| -3 | -2 | -3 | 0 | -5 | 0 | 5 | -4 |
| -1 | 1 | 0 | -2 | 4 | 0 | 2 | 0 |
| 0 | -2 | -1 | 1 | 0 | 0 | 2 | 0 |
| -1 | -2 | 1 | 0 | 0 | 1 | 0 | 0 |
| 0 | -1 | 0 | 2 | 0 | 0 | 0 | 1 |
| 0 | -1 | 1 | 0 | 0 | 0 | 0 | 0 |

FIG. 8A $R_4$

| | 0 | 1 | 2 | 3 | 4 | 5 | 6 | 7 |
|---|---|---|---|---|---|---|---|---|
| 0 | 106 | 177 | 156 | 128 | 112 | 98 | 128 | 116 |
| 1 | 111 | 48 | 96 | 123 | 191 | 47 | 47 | 117 |
| 2 | 114 | 80 | 103 | 128 | 176 | 113 | 95 | 120 |
| 3 | 119 | 131 | 123 | 111 | 92 | 171 | 159 | 122 |
| 4 | 192 | 204 | 184 | 188 | 101 | 136 | 144 | 159 |
| 5 | 96 | 74 | 110 | 127 | 109 | 40 | 111 | 159 |
| 6 | 63 | 53 | 143 | 162 | 138 | 59 | 121 | 221 |
| 7 | 119 | 121 | 105 | 96 | 95 | 175 | 120 | 32 |

FIG. 8B $G_4$

| 45 | 128 | 104 | 96 | 84 | 38 | 80 | 88 |
|---|---|---|---|---|---|---|---|
| 77 | 26 | 21 | 79 | 157 | 37 | 3 | 81 |
| 84 | 47 | 48 | 84 | 128 | 87 | 70 | 84 |
| 91 | 119 | 106 | 87 | 28 | 138 | 129 | 87 |
| 144 | 164 | 148 | 144 | 49 | 96 | 112 | 140 |
| 1 | 22 | 56 | 102 | 79 | 0 | 63 | 127 |
| 45 | 39 | 96 | 128 | 96 | 35 | 100 | 185 |
| 111 | 95 | 87 | 33 | 42 | 143 | 95 | 26 |

FIG. 8C $B_4$

| 0 | 24 | 8 | 15 | 11 | 0 | 4 | 4 |
|---|---|---|---|---|---|---|---|
| 9 | 0 | 0 | 15 | 35 | 0 | 0 | 7 |
| 12 | 0 | 0 | 5 | 32 | 7 | 2 | 3 |
| 20 | 31 | 24 | 13 | 0 | 35 | 28 | 16 |
| 27 | 31 | 26 | 26 | 0 | 13 | 11 | 40 |
| 0 | 0 | 0 | 16 | 12 | 0 | 0 | 22 |
| 0 | 0 | 27 | 17 | 16 | 0 | 17 | 50 |
| 23 | 23 | 23 | 0 | 0 | 29 | 11 | 0 |

FIG. 8D $Y_4$    $\delta_Y = 38.1$

|   | 0 | 1 | 2 | 3 | 4 | 5 | 6 | 7 |
|---|---|---|---|---|---|---|---|---|
| 0 | 58 | 130 | 108 | 96 | 84 | 51 | 85 | 86 |
| 1 | 79 | 29 | 41 | 84 | 153 | 35 | 15 | 83 |
| 2 | 84 | 51 | 58 | 88 | 131 | 85 | 69 | 85 |
| 3 | 91 | 112 | 101 | 85 | 43 | 136 | 126 | 89 |
| 4 | 145 | 160 | 144 | 143 | 58 | 98 | 110 | 134 |
| 5 | 29 | 35 | 65 | 99 | 80 | 11 | 70 | 124 |
| 6 | 45 | 38 | 102 | 125 | 99 | 38 | 96 | 180 |
| 7 | 103 | 94 | 85 | 48 | 53 | 139 | 92 | 24 |

FIG. 8E $I_4$    $\delta_I = 7.9$

| 34 | 32 | 33 | 22 | 19 | 33 | 30 | 20 |
|----|----|----|----|----|----|----|----|
| 22 | 13 | 39 | 27 | 26 | 7 | 22 | 23 |
| 20 | 20 | 31 | 28 | 31 | 19 | 18 | 24 |
| 19 | 13 | 15 | 17 | 34 | 24 | 23 | 23 |
| 33 | 30 | 27 | 31 | 29 | 26 | 24 | 17 |
| 47 | 27 | 31 | 19 | 20 | 20 | 29 | 24 |
| 12 | 10 | 29 | 25 | 27 | 14 | 17 | 28 |
| 11 | 18 | 14 | 34 | 29 | 25 | 19 | 5 |

FIG. 8F $Q_4$    $\delta_Q = 15.5$

| -32 | -60 | -56 | -45 | -41 | -29 | -46 | -46 |
|-----|-----|-----|-----|-----|-----|-----|-----|
| -39 | -16 | -23 | -39 | -66 | -20 | -8 | -43 |
| -41 | -29 | -33 | -46 | -56 | -44 | -38 | -46 |
| -40 | -46 | -43 | -41 | -24 | -57 | -55 | -41 |
| -66 | -73 | -67 | -66 | -33 | -48 | -55 | -53 |
| -16 | -19 | -37 | -47 | -38 | -6 | -39 | -57 |
| -25 | -21 | -42 | -61 | -47 | -21 | -45 | -73 |
| -45 | -40 | -35 | -27 | -29 | -62 | -46 | -14 |

FIG. 8G $F_{mn}(Y_4)$

|  | 0 | 1 | 2 | 3 | 4 | 5 | 6 | 7 |
|---|---|---|---|---|---|---|---|---|
| 0 | 86 | -3 | 0 | -8 | 6 | 0 | 0 | 0 |
| 1 | -2 | 7 | -7 | 5 | 7 | -9 | -5 | 3 |
| 2 | -11 | 0 | -7 | 4 | 1 | -6 | -1 | 7 |
| 3 | 2 | 0 | 3 | -29 | 8 | 0 | -8 | 0 |
| 4 | 15 | 19 | 12 | 8 | -36 | 6 | 1 | -13 |
| 5 | 2 | -13 | 1 | -12 | -6 | 3 | -2 | 0 |
| 6 | -7 | 1 | -2 | 6 | -7 | 0 | -3 | 0 |
| 7 | 13 | 4 | 2 | -6 | 3 | 0 | 0 | -1 |

FIG. 8H $F_{mn}(I_4)$

| 24 | 1 | -2 | 0 | 1 | 1 | 0 | 2 |
|---|---|---|---|---|---|---|---|
| 1 | 0 | 1 | -1 | -1 | 0 | 1 | 1 |
| -1 | 0 | -1 | -1 | -1 | 0 | 0 | 0 |
| 3 | 3 | 5 | 0 | -2 | 1 | 1 | 0 |
| 0 | 0 | -1 | 4 | -2 | 0 | -2 | -3 |
| 0 | -3 | 0 | 0 | 0 | -1 | 1 | 0 |
| 1 | 2 | 2 | 2 | -1 | 0 | 0 | -1 |
| 1 | 0 | -2 | -1 | 0 | 0 | 0 | -1 |

FIG. 8I $F_{mn}(Q_4)$

| -41 | 1 | 0 | 3 | -2 | 0 | 0 | 0 |
|---|---|---|---|---|---|---|---|
| 0 | -2 | 1 | 0 | -2 | 4 | 0 | -1 |
| 4 | 0 | 2 | -1 | -1 | 2 | 0 | -2 |
| -1 | 0 | -1 | 12 | -2 | 0 | 3 | -1 |
| -6 | -7 | -4 | -4 | 14 | -2 | 0 | 4 |
| 0 | 5 | 0 | 5 | 2 | -1 | 1 | 0 |
| 1 | 0 | 0 | -1 | 4 | 0 | 1 | 0 |
| -7 | -2 | 0 | 1 | 0 | 0 | 0 | 1 |

METHOD OF AN APPARATUS FOR COMPRESSING IMAGES DATA

BACKGROUND OF THE INVENTION

1. Field of the Invention

The present invention relates to a method of and apparatus for compressing image data of a color image in which the image data are compressed for each pixel block to reduce the amount of the image data.

2. Description of Prior Art

In general, images can be expressed by image data in image processing technique, and the amount of the image data is quite large. Accordingly, compression of the image data is employed for easy storage and transmission. However, the quality of images reproduced from the compressed image data is inferior to that of original images, and the deterioration of the image quality is in proportion of the compression rate of the image data.

Images can be classified into two types. The first type is such that the deterioration of image quality by data compression is visually noticeable. Images of objects the correct shapes of which can be easily remembered, e.g., images of characters and line segments, are typical ones of the first type images. On the other hand, the second type is such that the deterioration of image quality by data compression is hardly noticed, and it includes images of objects the correct shapes of which are not easily remembered. For example, images composed of fine color patterns are typical of the second type images.

In a conventional method of compressing images, the image data are compressed without distinction between these two types of images. Therefore, the deterioration of the image quality with respect to the first type becomes excessive at high compression rates. On the other hand, when the compression rate is lowered, the image quality is improved, however, the compressed image data cannot be stored and transmitted easily.

SUMMARY OF THE INVENTION

The present invention is directed to a method of compressing image data which represent an image in the form of an array of pixels for each color component, wherein the array of pixels are divided into pixel blocks each having a plurality of pixels.

An object of the present invention is to provide a system for increasing the rate at which image data is compressed without excessively deteriorating the quality of a reproduced images.

According to the present invention, the foregoing and other objects are achieved by classifying the pixel blocks into first and second types based on a first statistic representing the standard deviation of the luminance data and a second statistic representing the standard deviation of the color difference data. The image data are compressed at different compression rates with respect to the respective types, so that the data compression can be executed at suitable compression rates for the respective types of pixel blocks.

These and other objects, features, aspects and advantages of the present invention will become more apparent from the following detailed description, when taken in conjunction with the accompanying drawings.

BRIEF DESCRIPTION OF THE DRAWINGS

FIGS. 5A-5I, 6A-6I, 7A-7I and 8A-8I show image data and conversion coefficients for various images after orthogonal transform thereof;

DESCRIPTION OF PREFERRED EMBODIMENTS

A. Fundamental Conception

Figure 3:
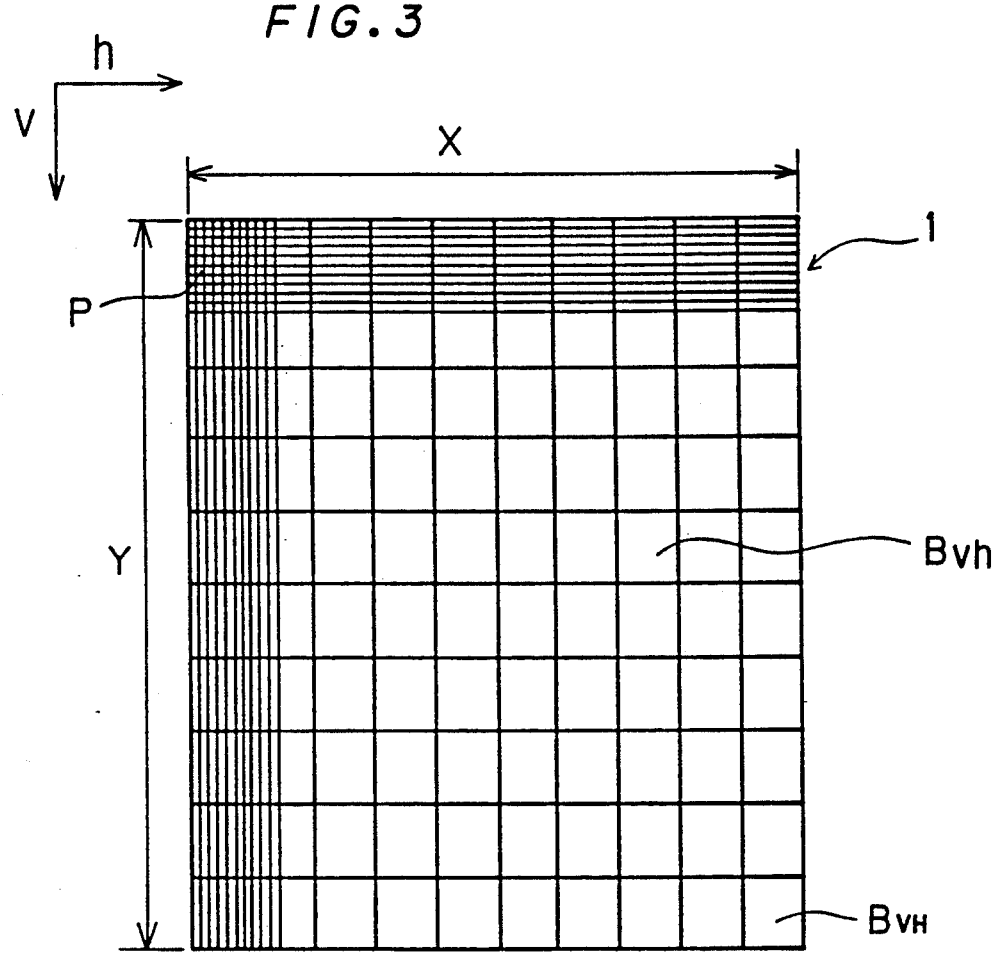
FIG. 3 is an explanatory view showing division of an image into blocks.
Figure 4:
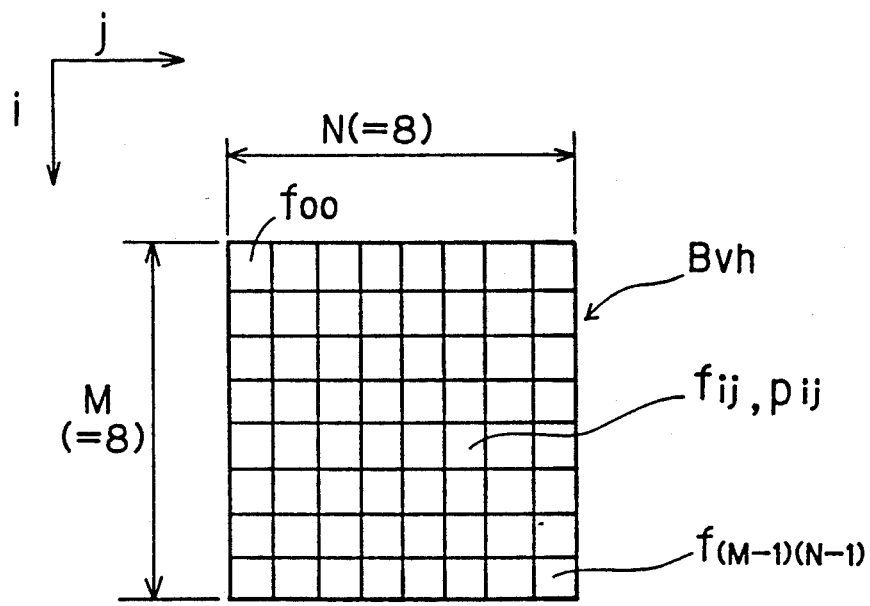
FIG. 4 is an explanatory view showing a pixel array forming a pixel block.

FIG. 3 shows conceptually an image 1 divided into pixel blocks. The image 1 is composed of $(X \times Y)$ number of pixels P while divided into $(V \times H)$ number of pixel blocks $B_{vh}$ each of which has a plurality of pixels. FIG. 4 shows conceptually the composition of one pixel block $B_{vh}$. The pixel block $B_{vh}$ is composed of $(M \times N)$ number of pixels $p_{ij}$, each of which is expressed by image data $f_{ij}$. FIG. 4 shows an example in which the pixel block $B_{vh}$ is composed of $(8 \times 8)$ pixels, however, the pixel block may be composed of $(4 \times 4)$ pixels, $(16 \times 16)$ pixels, and others. The image data are compressed for each pixel block $B_{vh}$.

The image 1 is a color image having a gradation, and the image data $f_{ij}$ thereof consist of components R, G and B which represent color luminance of red (R), green (G) and blue (B) for each pixel. The components R, G and B representing the color luminance are hereinafter simply referred to as "image data".

FIGS. 5A-5C, 6A-6C, 7A-7C and 8A-8C show examples of image data in pixel blocks for parts of images of "a spot", "an oblique line", "a bouquet" and "a carpet", respectively, which often appear in image processings. The images of "a spot" and "an oblique line" are examples of the first type images in which image quality deterioration by data compression is easily noticeable, and the images of "a bouquet" and "a carpet" are examples of the second type images in which image quality deterioration by data compression is hardly noticed.

Figures 5A, 5B, 5C:
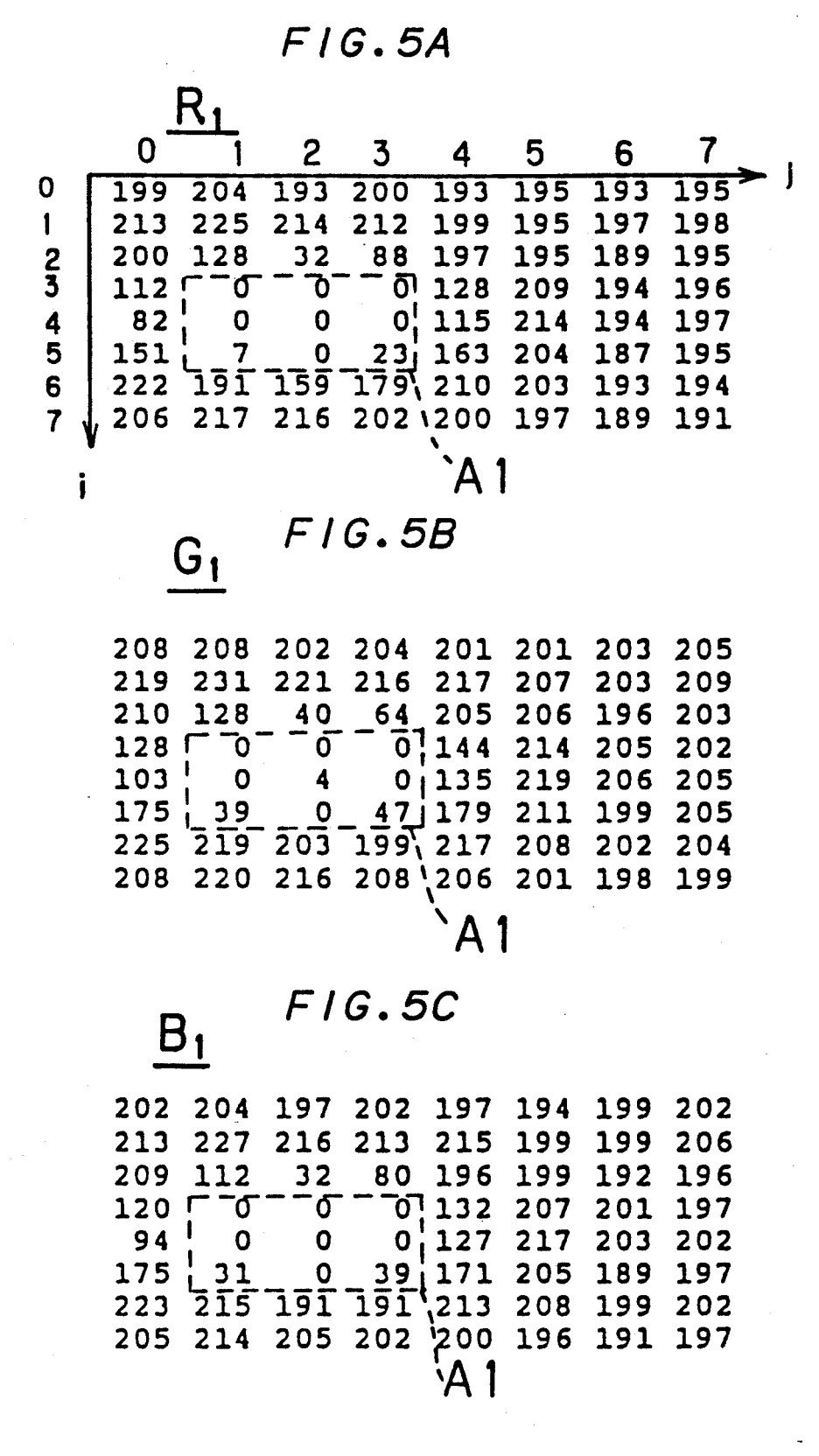

FIGS. 5A, 5B and 5C show image data $R_1$, $G_1$ and $B_1$ for the image of "a spot" respectively. The image data $R_1$, $G_1$ and $B_1$ for each pixel are composed of 8 bits and represent luminance in a 256-gradation respectively. The value "0" of the image data represents the minimum luminance and the value "255" thereof represents the maximum luminance. In FIGS. 5A, 5B and 5C, a region A1 surrounded by broken lines corresponds to a black spot portion, and the surroundings of the region A1 corresponds to a white region.

FIGS. 5D, 5E and 5F show image data $Y_1$, $I_1$ and $Q_1$ in NTSC (National Television System Committee) form into which the image data $R_1$, $G_1$ and $B_1$ are converted through the following formulas (1) and (2).

$$\begin{pmatrix} Y \\ I \\ Q \end{pmatrix} = M_X \begin{pmatrix} R \\ G \\ B \end{pmatrix} \quad (1)$$

$$M_X = \begin{pmatrix} 0.301 & 0.585 & 0.114 \\ 0.500 & -0.419 & -0.081 \\ -0.167 & -0.333 & 0.500 \end{pmatrix} \quad (2)$$

Standard deviations $\sigma$ of the image data $Y_1$, $I_1$ and $Q_1$ within respective pixel blocks are additionally shown in FIGS. 5D, 5E and 5F.

Hereinafter, the image data $Y_1$ are referred to as luminance data, and the image data $I_1$ and $Q_1$ are referred to as first and second color difference data respectively.

FIGS. 5G, 5H and 5I show conversion coefficients $F_{mn}(Y_1)$, $F_{mn}(I_1)$ and $F_{mn}(Q_1)$ obtained by executing a discrete cosine conversion (hereinafter referred to as a DCT conversion) on the image data $Y_1$, $I_1$ and $Q_1$ according to the following formula (3), in the form of rounded values to integers:

$$F_{mn}(f_{ij}) = \frac{4}{M \times N} C_{mn} \sum_{i=0}^{M-1} \sum_{j=0}^{N-1} f_{ij} \times \cos\frac{(2i+1)m\pi}{2M} \cos\frac{(2j+1)n\pi}{2N} \quad (3)$$

where $$C_{mn} = \begin{cases} \frac{1}{2}: m = n = 0 \\ \frac{1}{\sqrt{2}}: m \cdot n = 0 \text{ (except } m = n = 0) \\ 1: m \cdot n \neq 0, \end{cases}$$

Integers m and n normally range from 0 to (M−1) and 0 to (N−1) respectively, and $f_{ij}$ represents the image data $Y_1$, $I_1$ and $Q_1$ in an i-j pixel.

FIGS. 6A, 6B and 6C show image data $R_2$, $G_2$ and $B_2$ for an image of "an oblique line". A region $A_2$ surrounded by broken lines corresponds to a black "oblique line" portion in FIGS. 6A, 6B and 6C. FIGS. 6D, 6E and 6F show image data $Y_2$, $I_2$ and $Q_2$ in the NTSC form into which the image data $R_2$, $G_2$ and $B_2$ are converted according to the formulas (1) and (2), and FIGS. 6G, 6G and 6I show conversion coefficients $F_{mn}(Y_2)$, $F_{mn}(I_2)$ and $F_{mn}(Q_2)$ obtained by executing the DCT conversion on the image data $Y_2$, $I_2$ and $Q_2$.

FIGS. 7A–7I and 8A–8I show image data and the like similar to FIGS. 5A–5I and 6A–6I for images of "a bouquet" and "a carpet" respectively.

On analysis of the luminance data Y ($Y_1$–$Y_4$) and the color difference data I ($I_1$–$I_4$) and Q ($Q_1$–$Q_4$) in FIGS. 5A–5I to 8A–8I, it is found that the first type images illustrated in FIGS. 5A–5I and 6A–6I have the following features F1 and F2:

Feature F1: The standard deviation $\sigma_Y$ of the luminance data Y is large;

Feature F2: The standard deviation $\sigma_Q$ of the color difference data Q is small.

The feature F1 results from drastic changes in luminance across the outlines of points and line segments in the first type images. The standard deviation $\sigma_Y$ of the luminance data Y is considerably large also in the second type images illustrated in FIGS. 7A–7I and 8A–8I. However, the feature F1 is effective for discriminating images of the first type from those of the second type, since luminance change in the former is larger than that in the latter.

Figure 9A:
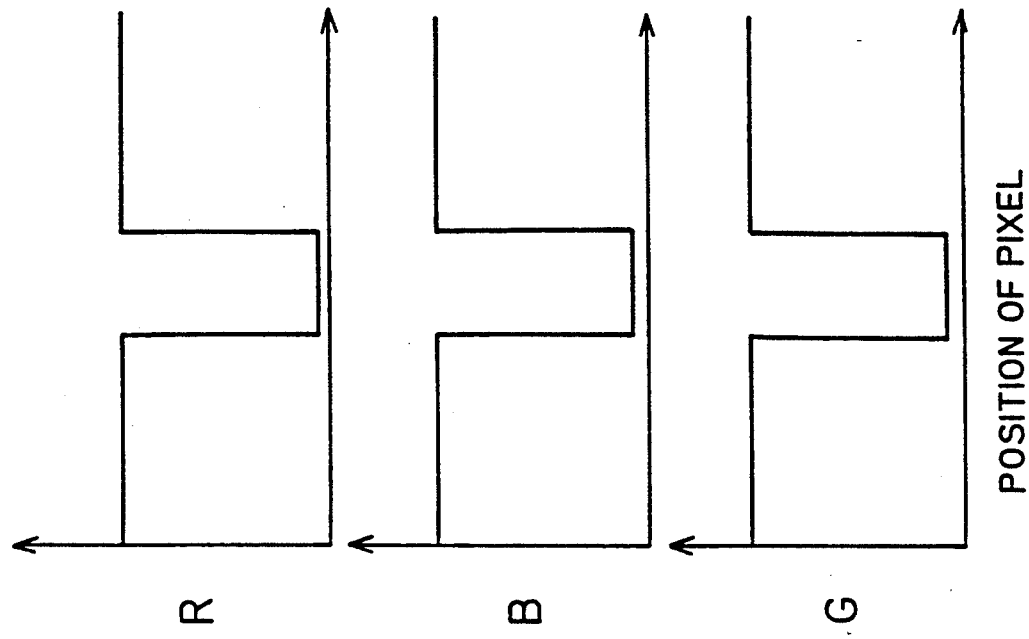
FIGS. 9A and 9B show conceptually examples of distribution states of image data in pixel blocks.
Figure 9B:
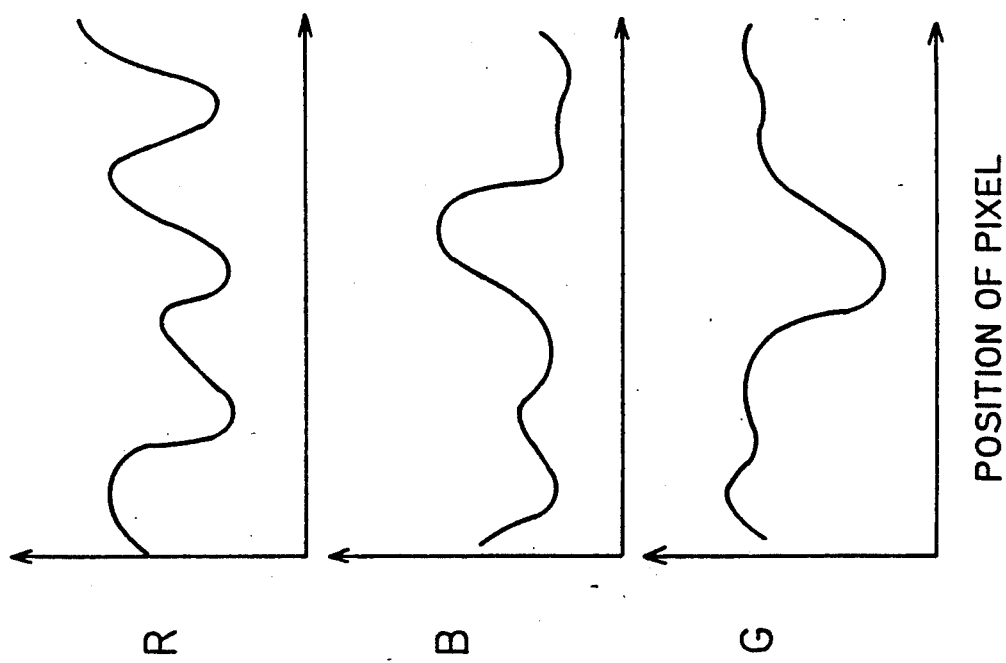

The feature F2 results from the difference in distribution state of the image data R, G and B between images of the first and second types. FIGS. 9A and 9B show typical distribution examples of the image data R, G and B along an imaginary line which traverses typical images of the first and second types respectively. In the first type images, the image data R, G and B often have distribution shapes similar to one another as shown in FIG. 9A. On the contrary, in images of the second type, the distribution shapes of the image data R, G and B are considerably different from one another. According to the formulas (1) and (2) described above, the color difference data Q can be expressed by a linear combination of (B−R) and (B−G) as follows:

$$\begin{aligned} Q &= -0.167R - 0.333G + 0.500B \\ &= 0.167(B - R) + 0.333(B - G) \end{aligned} \quad (4)$$

The color difference data Q comprise two difference data (B−R) and (B−G) among the image data R, G and B as components thereof. In images of the first type in which the distribution shapes of the image data R, G and B are similar to one another as shown in FIG. 9A, the values of the color difference data Q comprising the difference data (B−R) and (B−G) do not change very much within each pixel block; accordingly the standard deviation $\sigma_Q$ thereof is small. On the contrary, in images of the second type, the values of the color difference data Q change largely within each pixel block; accordingly the standard deviation $\sigma_Q$ thereof is large.

Therefore, images of the first type and those of the second type can be discriminated from each other through the following judgement conditions C1 and C2 corresponding to the aforesaid two features F1 and F2:

Condition C1: $\sigma_{t1} < \sigma_y$

Condition C2: $\sigma_Q < \sigma_{t2}$ where $\sigma_{t1}$ and $\sigma_{t2}$ are predetermined threshold values. For example, $\sigma_{t1} = 23$ and $\sigma_{t2} = 8.8$ are suitable in this preferred embodiment.

Since pixel blocks which satisfy both of the conditions C1 and C2 have images of the first type, the image quality can be prevented from deteriorating excessively if the image data within the pixel blocks are compressed at a relatively low compression rate. Since pixel blocks which do not satisfy at least one of the conditions C1 and C2 have images of the second type, the amounts of the image data can be reduced without deteriorating the image quality even if the image data within the pixel blocks are compressed at a relatively high compression rate.

The compression rates for images of the first type may be modified by adding the following condition C3:

Condition C3: $N_{th} < N_F$ where $N_{th}$ is a predetermined threshold value and $N_F$ is the number of conversion coefficients $F_{mn}(Y)$ of the luminance data Y whose absolute values $|F_{mn}(Y)|$ exceed a threshold value $F_{th}$ in an objective pixel block. For example, $N_{th} = 20$ and $F_{th} = 8$ are suitable in this preferred embodiment. Hereinafter, the conversion coefficient $F_{mn}(Y)$ whose absolute value exceeds the threshold value $F_{th}$ is referred to as "a dominant component", and the number of dominant components within a pixel block is referred to as "a dominant component number".

Figure 10A:
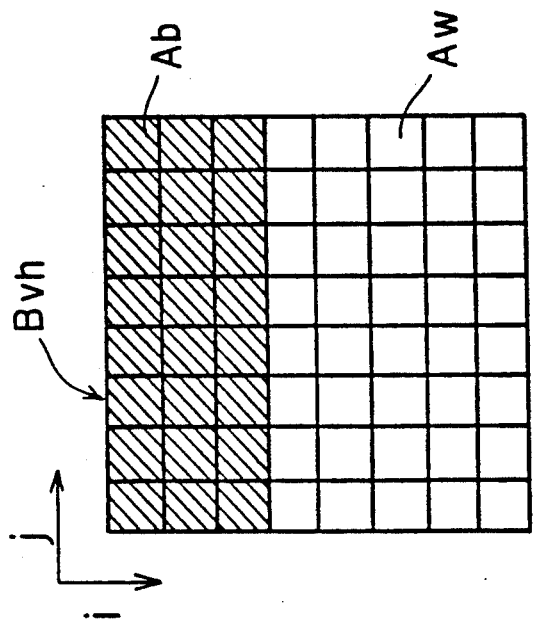
FIGS. 10A and 10B are explanatory views showing examples of images in pixel blocks.
Figure 10B:
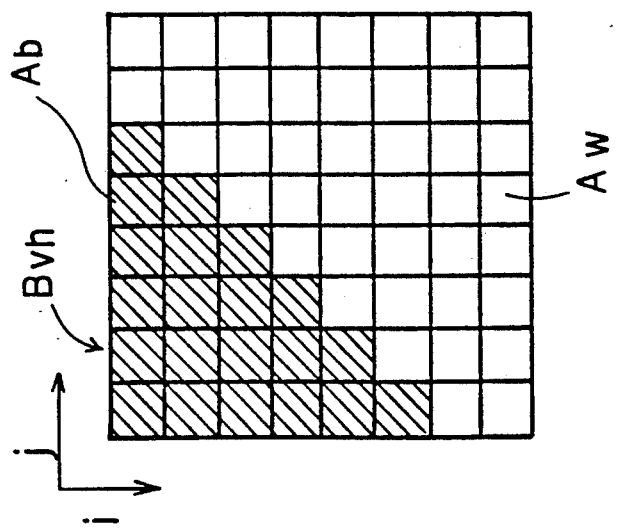

The purpose of condition C3 is to discriminate between a first type image having a small number of dominant components of the conversion coefficients $F_{mn}(Y)$ and a first type image having a large number thereof. FIGS. 10A and 10B show the pixel block $B_{vh}$ divided by shading into a black region $A_b$ and a white region $A_w$ as examples of images of the first type. The boundary between the regions $A_b$ and $A_w$ is parallel to the j-direction in FIG. 10A and is inclined in FIG. 10B. In the image shown in FIG. 10A, the luminance distribution in the j-direction is even, so that the values of the conversion coefficients $F_{mn}(Y)$, representing frequency components in the j-direction, approximate to zero. Accordingly, the dominant component number $N_F$ of the conversion coefficients $F_{mn}(Y)$ is low. On the contrary, in the image shown in FIG. 10B, the luminance changes are large in the i- and j-directions, so that the dominant component number of the conversion coefficients $F_{mn}(Y)$ is high.

By selecting pixel blocks which satisfy the above-mentioned condition C3, only the pixel blocks having a large number of dominant components of the conversion coefficients $F_{mn}(Y)$ can be specified among pixel blocks of the first type including the portions in which the deterioration of the image quality is noticeable such as characters and line segments. The image data in pixel blocks satisfying the condition C3 are compressed at a relatively large compression rate so that a relatively large number of conversion coefficients $F_{mn}(Y)$ are included in the compressed image data. On the contrary, the image data in pixel blocks not satisfying the condition C3 are compressed at a relatively small compression rate so that a relatively small number of conversion coefficients $F_{mn}(Y)$ are included in the compressed image data. Through the above-indicated subclassification of image data of the first type and modification of the compression rates thereof, the compression rates can be further raised as a whole without deteriorating image quality.

B. Structure of Apparatus and Operation

Figure 1:
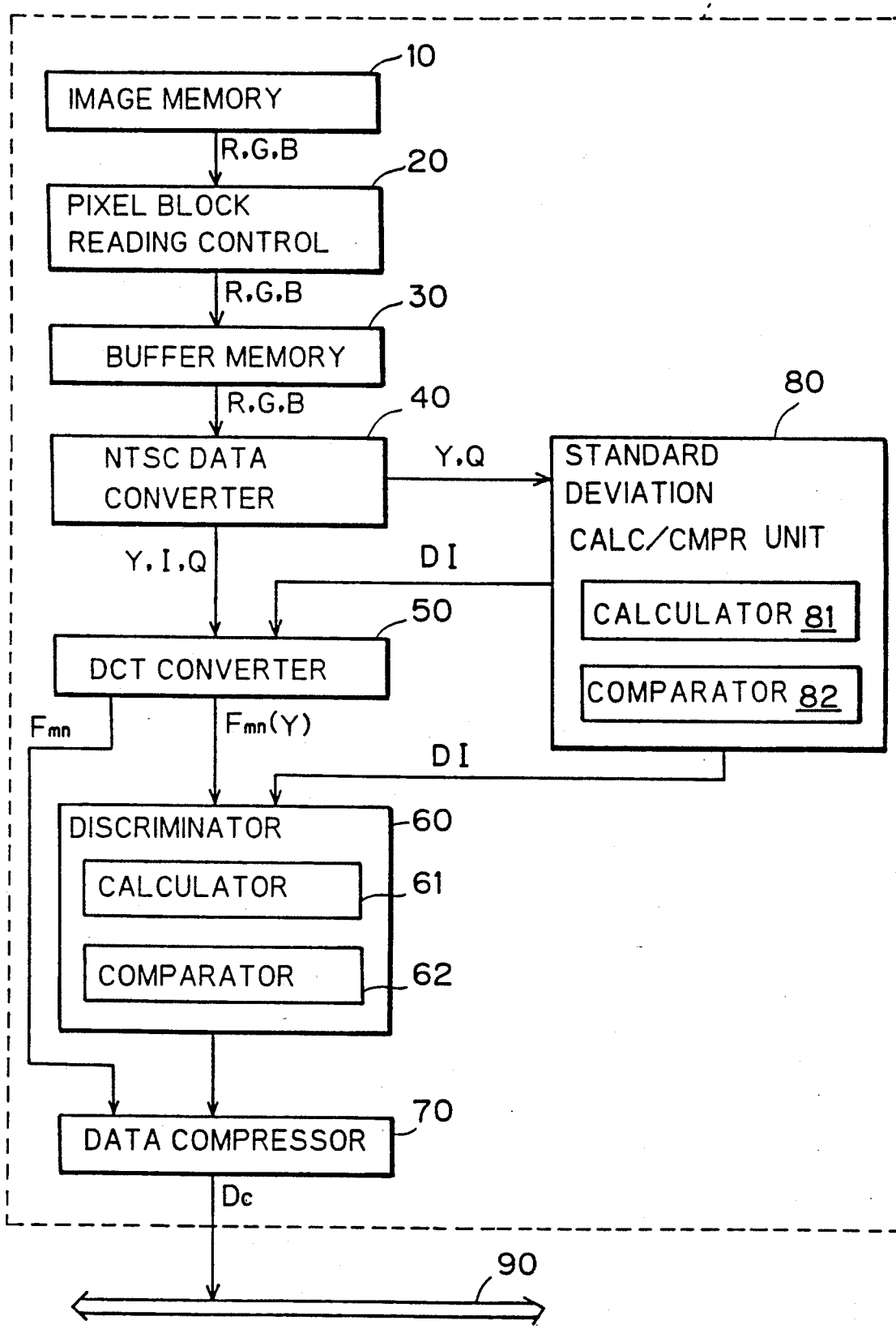
FIG. 1 is a schematic diagram of an apparatus according to a preferred embodiment of the present invention.
Figure 2:
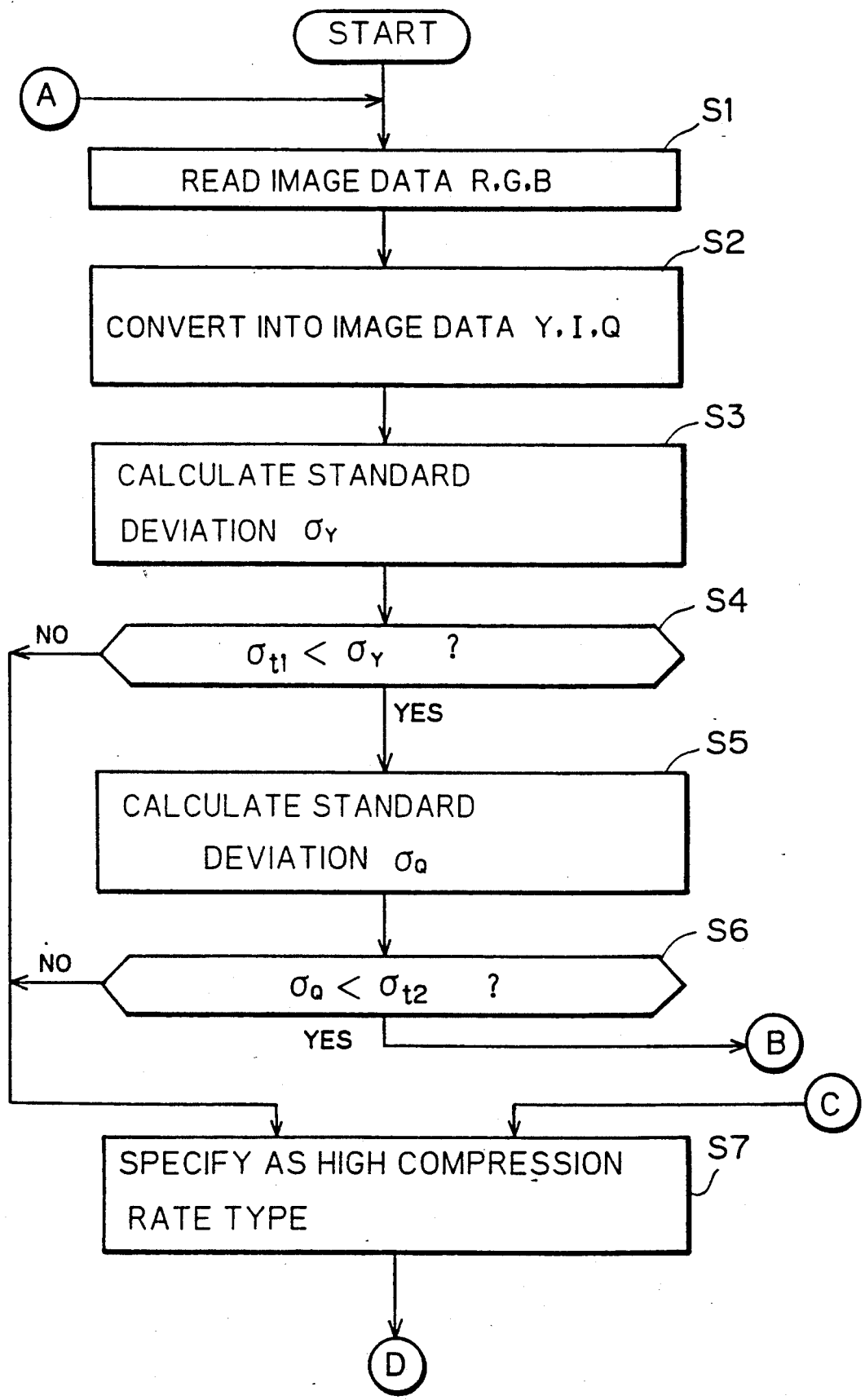
FIG. 2 is a flow chart showing the operation of the preferred embodiment.
Figure 2:
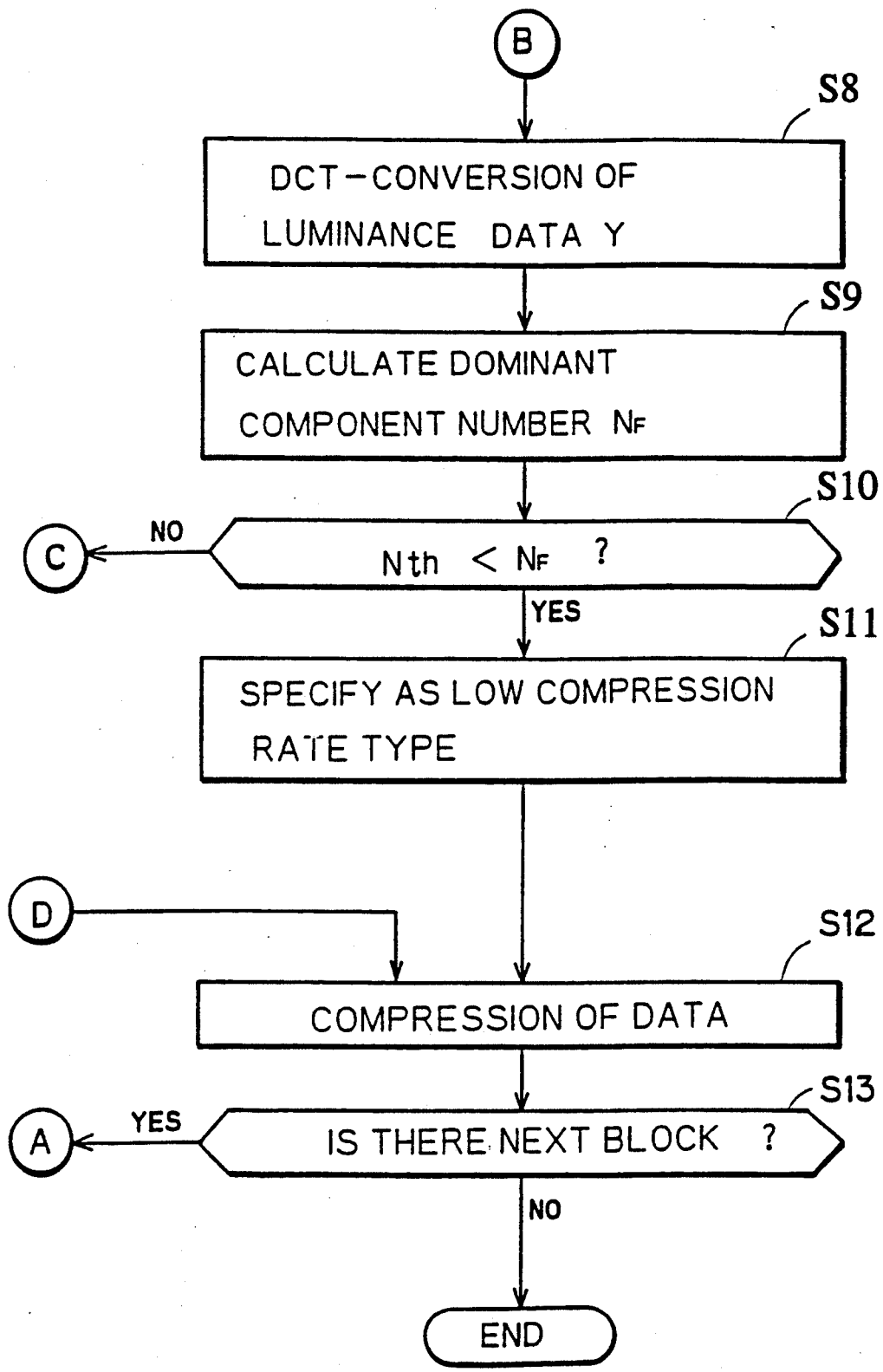

FIG. 1 is a schematic structural diagram showing an image data compression apparatus AP according to a preferred embodiment of the present invention. The image data compression apparatus AP comprises an image memory 10, a pixel block reading controller 20, a buffer memory 30, an NTSC data converter 40, a DCT converter 50, a discriminator 60, a data compressor 70 and a standard deviation calculation-comparison unit 80. The operation of the image data compression apparatus AP will hereinafter be described in conjunction with a flow chart shown in FIG. 2.

In step S1, the image data R, G and B within one pixel block $B_{vh}$ are read out by the pixel block reading controller 20 from the image memory 10 and stored in the buffer memory 30.

In step S2, the image data R, G and B are inputted from the buffer memory 30 to the NTSC data converter 40, in which a luminance signal Y and color difference signals I and Q are generated based on the formulas (1) and (2).

In steps S3 to S6, a determination is made as to whether or not the pixel block satisfies conditions C1 and C2.

In step S3, the luminance data Y are transmitted from the NTSC data converter 40 to the standard deviation calculation-comparison unit 80. The standard deviation $\sigma_Y$ for the luminance data Y is calculated in a calculator 81 provided in the standard deviation calculation-comparison unit 80.

In step S4, the standard deviation $\sigma_Y$ is compared to the predetermined threshold value $\sigma_{t1}$ in a comparator 82, which is also provided in the standard deviation calculation-comparison unit 80. As a result of the comparison, when the condition C1 is not satisfied, the process is advanced to step S11, in which the pixel block is specified as a high compression rate type. This result is transmitted from the standard deviation calculation-comparison unit 80 to the discriminator 60 in the form of a type identification data DI.

Pixel blocks of the "high compression rate type" are defined as pixel blocks in which the deterioration in the quality of reproduced images is unnoticeable even if the image data are compressed at a high compression rate, and include:

(i) pixel blocks of the second type; and (ii) pixel blocks of the first type as determined from step S9, such as the pixel block shown in FIG. 10A.

On the other hand, when the condition C1 is satisfied in step S4, the process is advanced to step S5.

In step S5, the color difference data Q are transmitted from the NTSC data converter 40 to the standard deviation calculation-comparison unit 80, in which the standard deviation $\sigma_Q$ thereof is calculated.

In step S6, the standard deviation $\sigma_Q$ is compared with the predetermined threshold value $\sigma_{t2}$ in the comparator 82. As a result of the comparison, when the condition C2 is not satisfied, the process is advanced to step S7, in which this pixel block is specified as the high compression rate type. This result is also transmitted by supplying the type identification data DI from the standard deviation calculation-comparison unit 80 to the discriminator 60. When the condition C2 is satisfied, the process is advanced to step S7.

In step S8, the luminance data Y are transmitted from the NTSC data converter 40 to the DCT converter 50, in which the conversion coefficients $F_{mn}(Y)$ are calculated.

In step S9, a calculator 61 provided in the discriminator 60 calculates the dominant component number $N_F$ of the conversion coefficients $F_{mn}(Y)$.

In step S10, the dominant component number $N_F$ is compared with the threshold value $N_{th}$ in a comparator 62 provided in the discriminator 60. As a result of the comparison, when the condition C3 is not satisfied, is advanced to the process step S7, in which this pixel block is specified as the high compression rate type. On the other hand, when the condition C3 is satisfied, the process is advanced to the step S11, in which this pixel block is specified as a low compression rate type.

Steps S1 to S11, determine whether one pixel block belongs to the low compression rate type or the high compression rate type. In step S12, the image data are compressed based on the result. That is, the image data are compressed at the low compression rate for a low compression rate type pixel block, and the image data are compressed at the high compression rate for a high compression rate type pixel block.

According to the preferred embodiment, the data compression is conducted as follows: The image data Y, I and Q are first supplied from the NTSC data converter 40 to the DCT coverter 50, in which the conversion coefficients $F_{mn}(Y)$, $F_{mn}(I)$ and $F_{mn}(Q)$ are calculated. The conversion coefficients $F_{mn}(Y)$, $F_{mn}(I)$ and $F_{mn}(Q)$ are transmitted from the DCT converter 50 to the data compressor 70, in which the data are compressed. As for the high compression rate type pixel block, for example, 20 components out of 64 components of the respective conversion coefficients $F_{mn}(Y)$, $F_{mn}(I)$ and $F_{mn}(Q)$ are taken out to constitute the compressed image data. Accordingly, the compression rate is 64/20=3.2. In other words, part of the respective conversion coefficients are selected at a selection rate of 20:64 (=20/64), which is the inverse of the compression rate 64/20.

As for the low compression rate type pixel block, 40 components of the respective conversion coefficients are taken out to constitute the compressed image data, in which the compression rate is 64/40=1.6. In this case, a selection rate of 40:64 (=40/64) is employed, which is the inverse of the compression rate 64/40.

In step S13, if there is a pixel block unprocessed, the procedure of the steps S1 to S12 is repeated for the next pixel block untill all the pixel blocks are compressed, whereby compressed image data for the whole image is produced.

When a standard color image (i.e., an image used for verifying image quality) is processed according to the above-mentioned procedure, more than several percent of the data amount of the image data can be reduced as compared with the conventional data compression in which the low compression rate type and the high compression rate type are not discriminated from each other, while maintaining the image quality equal to or more than that in the conventional data compression. When the amount of the image data is similar to that in the conventional data compression, the image quality can be further improved.

The compressed image data $D_c$ thus obtained are outputted from the data compressor 70 to a transmission path 90 to an external circuit (not shown).

C. Modifications (1) As image data, not only the RGB image data representing a television image but also YMC image data representing a printing image may be used. Red (R), green (G) and blue (B) primary color components of the RGB image data are approximate complementary colors to cyan (C), magenta (M) and yellow (Y) primary color components of the YMC image data respectively. Hence, image data Y, I and Q in the NTSC form just like the above-mentioned preferred embodiment can be obtained based on the YMC image data.

(2) In the above-mentioned preferred embodiment, the image data Y, I and Q are converted through DCT conversion. However, other orthogonal transforms may be executed, for example, Fourier transform and Hadamard transform.

(3) In the image data compression according to the above-mentioned preferred embodiment, only part of the conversion coefficients $F_{mn}$ are used to constitute compressed image data. However, other compression procedures may be used, as long as a high compression rate and a low compression rate are used according to the types of images represented by respective pixel blocks.

(4) The condition C3, which is a supplementary condition, may be omitted as described above. In such case, steps S7 to S9 should be omitted.

(5) The conditions C1 and C2 for discriminating between images of the first and second types may be established not only based on the standard deviations $\sigma_Y$ and $\sigma_Q$ of the luminance data Y and the color difference data Q themselves but also based on statistics substantially representing the standard deviations. An example thereof is statistical dispersions of the luminance data Y and the color difference data Q.

(6) The luminance data Y and the color difference data Q are not limited to the data defined by the formulas (1) and (2). The coefficients of the formula (2) may be changed to other values.

Although the present invention has been described and illustrated in detail, it is clearly understood that the same is by way of illustration and example only and is not to be taken by way of limitation. The spirit and scope of the present invention should be limited only by the terms of the appended claims.

I claim:

1. A method of compressing image data which represent an image in the form of an array of pixels for each color component, wherein said array of pixels are divided into pixel blocks each having a plurality of pixels, said method comprising the steps of:
    (a) obtaining luminance data representing luminance of said image for each pixel as a function of said image data;
    (b) obtaining color difference data representing differences between said image data of respective color components for each pixel;
    (c) obtaining a first statistic representing a standard deviation of said luminance data in each pixel block;
    (d) obtaining a second statistic representing a standard deviation of said color difference data in each pixel block;
    (e) comparing said first and second statistics with first and second threshold values, respectively, to classify respective pixel blocks into first and second type pixel blocks; and
    (f) compressing said image data of said first type pixel blocks at a first compression rate and compressing said image data of said second type pixel blocks at a second compression rate to thereby obtain compressed image data, wherein said first compression rate is different from said second compression rate.

2. The method of claim 1, wherein
said type pixel block is classified as one whose respective first statistic is larger than said first threshold value and whose respective second statistic is smaller than said second threshold valve.

3. The method of claim 2, wherein
said second type pixel block is classified as one whose respective first statistic is smaller than said first threshold value and/or whose respective second statistic is larger than said second threshold value.

4. The method of claim 3, wherein
said first compression rate is smaller than said second compression rate.

5. The method of claim 4, further comprising the steps of:
    (g) applying an orthogonal transformation to said color difference data in said first type pixel blocks to obtain a plurality of orthogonal transformation coefficients in each pixel block;
    (h) comparing an absolute value of each orthogonal transformation coefficient with a third threshold value;
    (i) counting a number of orthogonal transformation coefficients whose absolute value is larger than said third threshold value in said first type pixel blocks; and (j) comparing said number of orthogonal transformation coefficients in said first type pixel blocks with a fourth threshold value to specify a first type pixel block having a number of orthogonal transformation coefficients larger than said fourth threshold value; and wherein step (f) includes:

compressing said image data of said first type pixel block specified in step (j) at said second compression rate instead of at said first compression rate.

6. The method of claim 5, wherein step (f) includes selecting part of said orthogonal transformation coefficients in each said first type pixel block at a first selection rate to obtain said compressed image data for said first type pixel blocks, said first selection rate being an inverse of said first compression rate; and selecting part of said orthogonal transformation coefficients in each second type pixel block at a second selection rate to obtain said compressed image data for said second type pixel blocks, said second selection rate being an inverse of said second compression rate.

7. The method of claim 6, wherein said image data represent said image in three primary colors comprising first to third color components.

8. The method of claim 7, wherein step (b) includes calculating a linear combination of:

a difference between respective image data for said first and second color components for each pixel; and a difference between respective image data for said first and third color components for each pixel;

to thereby obtain said color difference data for each pixel.

9. An apparatus for compressing image data which represent an image in the form of an array of pixels for each color component, wherein said array of pixels are divided into pixel blocks each having a plurality of pixels, said apparatus comprising:

(a) means for obtaining luminance data representing luminance of said image for each pixel as a function of said image data;

(b) means for obtaining color difference data representing differences between said image data of respective color components for each pixel;

(c) means for obtaining a first statistic representing a standard deviation of said luminance data in each pixel block;

(d) means for obtaining a second statistic representing a standard deviation of said color difference data in each pixel block;

(e) means for comparing said first and second statistics with first and second threshold values, respectively, to classify respective pixel blocks into first and second type pixel blocks; and (f) means for compressing said image data on said first type pixel blocks at a first compression rate and compressing said image data on said second type pixel blocks at a second compression rate to thereby obtain compressed image data, wherein said first compression rate is different from said second compression rate.

10. The apparatus of claim 9, wherein means (e) classifies said first type pixel block as one whose respective first statistic is larger than said first threshold value and whose respective second statistic is smaller than said second threshold value.

11. The apparatus of claim 10, wherein means (e) classifies said second type pixel block as one whose respective first statistic is smaller than said first threshold value and/or whose respective second statistic is larger than said second threshold value.

12. The apparatus of claim 11, wherein said first compression rate is smaller than said second compression rate.

13. The apparatus of claim 12, further comprising:

(g) means for applying an orthogonal transformation to said color difference data in said first type pixel blocks to obtain a plurality of orthogonal transformation coefficients in said first type pixel blocks;

(h) means for comparing an absolute value of each orthogonal transformation coefficient with a third threshold value;

(i) means for counting a number of orthogonal transformation coefficients whose absolute value is larger than said third threshold value in said first type pixel blocks; and (j) means for comparing said number of orthogonal transformation coefficients in said first type pixel blocks with a fourth threshold value to specify a first type pixel block having a number of orthogonal transformation coefficients larger than said fourth threshold value; and wherein means (f) compresses said image data on said first type pixel block specified in means (j) at said second compression rate instead of said first compression rate.

14. The apparatus of claim 13, wherein means (f)

compresses image data by selecting part of said orthogonal transformation coefficients in each first type pixel block at a first selection rate said first selection rate being an inverse of said first compression rate; and selects part of said orthogonal transformation coefficients in each second type pixel block at a second selection rate said second selection rate being an inverse of said second compression rate.

15. The apparatus of claim 14, wherein said image data represents said image in three primary colors comprising first to third color components.

16. The apparatus of claim 15, wherein means (b):

calculates linear combination of:

a difference between respective image data for said first and second color components for each pixel; and a difference between respective image data for said first and third color components for each pixel;

to thereby obtain said color difference data for each pixel.

* * * * *